(12) United States Patent
Okuni

(10) Patent No.: US 10,684,804 B2
(45) Date of Patent: Jun. 16, 2020

(54) IMAGE FORMING APPARATUS AND CONTROL METHOD OF IMAGE FORMING APPARATUS

(71) Applicant: KYOCERA Document Solutions Inc., Osaka (JP)

(72) Inventor: Seiji Okuni, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 16/421,847

(22) Filed: May 24, 2019

(65) Prior Publication Data

US 2019/0361638 A1 Nov. 28, 2019

(30) Foreign Application Priority Data

May 25, 2018 (JP) ................................. 2018-100463

(51) Int. Cl.
*H04N 1/00* (2006.01)
*G06F 3/12* (2006.01)

(52) U.S. Cl.
CPC ............ *G06F 3/1207* (2013.01); *G06F 3/121* (2013.01); *G06F 3/1256* (2013.01); *G06F 3/1259* (2013.01); *G06F 3/1267* (2013.01); *G06F 3/1273* (2013.01)

(58) Field of Classification Search
CPC ...... G06F 3/1207; G06F 3/1267; G06F 3/121; G06F 3/1259; G06F 3/1256; G06F 3/1273

USPC ....................................................... 358/1.14
See application file for complete search history.

(56) References Cited

U.S. PATENT DOCUMENTS

2008/0030769 A1* 2/2008 Hanaoka ............ G03G 15/5075
358/1.15
2016/0124692 A1* 5/2016 Nakatsu ................ G06F 3/1285
358/1.15

FOREIGN PATENT DOCUMENTS

JP 2006-205671 A 8/2006

* cited by examiner

*Primary Examiner* — Saeid Ebrahimi Dehkordy
(74) *Attorney, Agent, or Firm* — Studebaker & Brackett PC

(57) ABSTRACT

An image forming apparatus forms an image on a recording medium. The image forming apparatus includes a determining section, a first acquiring section, a second acquiring section, a specifying section, and a notifying section. The determining section determines whether or not an event has occurred involving interruption to an operation through which the image is formed. The first acquiring section acquires identification information for identifying terminal devices respectively associated with a plurality of users. The second acquiring section acquires history data indicating use history of the recording medium for each of the users. The specifying section specifies at least one user of the users based on the history data when occurrence of the event has been determined. The notifying section notifies a terminal device corresponding to the specified user of a message prompting work to resolve the event.

18 Claims, 6 Drawing Sheets

IMAGE FORMING APPARATUS AND CONTROL METHOD OF IMAGE FORMING APPARATUS

INCORPORATION BY REFERENCE

The present application claims priority under 35 U.S.C. § 119 to Japanese Patent Application No. 2018-100463, filed on May 25, 2018. The contents of this application are incorporated herein by reference in their entirety.

BACKGROUND

The present disclosure relates to an image forming apparatus and a control method of an image forming apparatus.

Application of a technique to an image forming apparatus has been studied by which a user closest to the image forming apparatus is detected and the user is notified of a predetermined message when a paper outage or the like has occurred.

SUMMARY

An image forming apparatus according to an aspect of the present disclosure forms an image on a recording medium. The image forming apparatus includes a determining section, a first acquiring section, a second acquiring section, a specifying section, and a notifying section. The determining section determines whether or not an event has occurred involving interruption to an operation through which the image is formed. The first acquiring section acquires identification information for identifying terminal devices respectively associated with a plurality of users. The second acquiring section acquires history data indicating use history of the recording medium for each of the users. The specifying section specifies at least one user of the users based on the history data when occurrence of the event has been determined. The notifying section notifies a terminal device corresponding to the specified user of a message prompting work to resolve the event.

A control method of an image forming apparatus according to an aspect of the present disclosure is to be implemented in an image forming apparatus which forms an image on a recording medium. The control method includes: determining whether or not an event has occurred involving interruption to an operation through which the image is formed; acquiring identification information for identifying terminal devices respectively associated with a plurality of users; acquiring history data indicating use history of the recording medium for each of the users; specifying at least one user of the users based on the history data when occurrence of the event has been determined; and notifying a terminal device corresponding to the specified user of a message prompting work to resolve the event.

DETAILED DESCRIPTION

Figure 1:
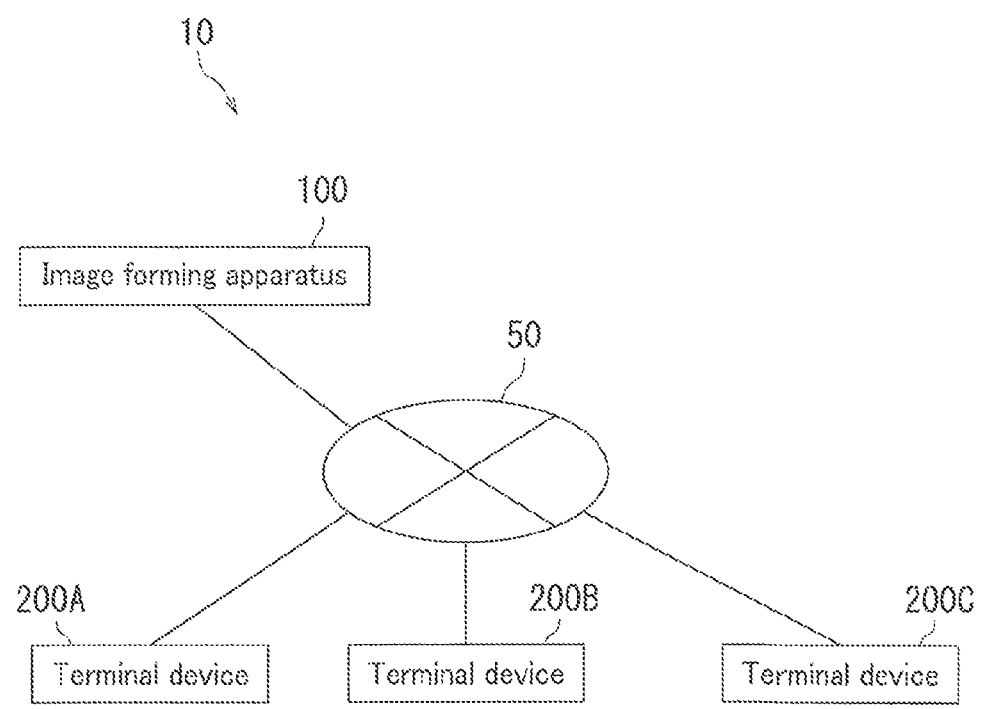
FIG. 1 is a diagram schematically illustrating an image forming system according to an embodiment of the present disclosure.

The following describes an embodiment of the present disclosure with reference to the accompanying drawings (FIGS. 1 to 6). Elements that are the same or equivalent are labelled with the same reference signs in the drawings and description thereof is not repeated.

The following first describes an image forming system 10 with reference to FIG. 1. FIG. 1 is a diagram schematically illustrating the image forming system 10 according to the embodiment of the present disclosure.

The image forming system 10 includes an image forming apparatus 100 and a plurality of terminal devices 200. The image forming system 10 illustrated in FIG. 1 includes three terminal devices 200. The terminal devices 200 include a terminal device 200A, a terminal device 200B, and a terminal device 200C.

The terminal device 200A is associated with a user A. The terminal device 200B is associated with a user B. The terminal device 200C is associated with a user C.

Specifically, the image forming apparatus 100 and the terminal devices 200 are communicably connected to each other through a network 50. For example, the image forming apparatus 100 and each of the terminal devices 200 are communicably connected through the Internet, a local area network (LAN), or a wide area network (WAN). Short-range wireless communication may also be performed between the image forming apparatus 100 and the terminal devices 200. The short-range wireless communication is communication through a method such as BLUETOOTH (registered Japanese trademark).

The image forming apparatus 100 forms an image on a recording medium (paper, for example) based on print data received from each terminal device 200. The print data is represented in a data format capable of forming an image on the recording medium. The print data includes information indicating a number of sheets of the recording medium on which the image is to be formed (the number of sheets of the recording medium on which the image is to be formed may be referred to in the following as a "number of print sheets").

The image forming apparatus 100 transmits a predetermined message to a specific user when an event has occurred which involves interruption to an image forming operation through which the image is formed. The event involving interruption to the image forming operation (referred to in the following as an "event") is for example a paper outage, a toner outage, an ink outage, or a paper jam. The specific user is a user having a large cumulative value of used sheets of the recording medium. The predetermined message is a message prompting work of resolving the event.

The terminal device 200 transmits the print data to the image forming apparatus 100 according to user instruction. The terminal device 200 also receives and displays the predetermined message transmitted from the image forming apparatus 100. The terminal device 200 is a personal computer, for example.

Figure 2:
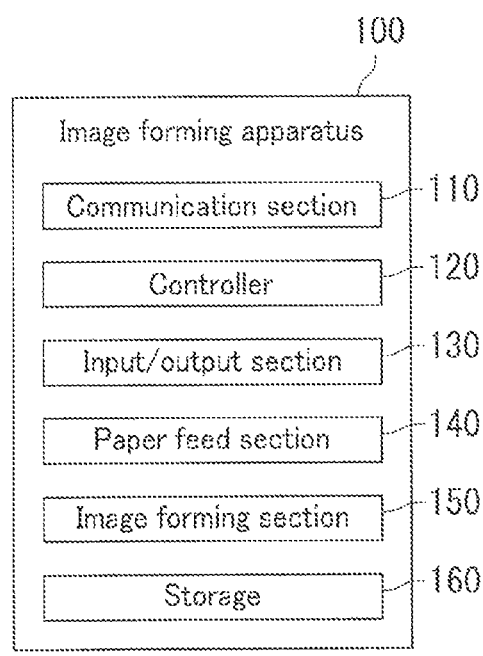
FIG. 2 is a block diagram illustrating an image forming apparatus.

The following describes the image forming apparatus 100 with reference to FIG. 2. FIG. 2 is a block diagram illustrating the image forming apparatus 100.

The image forming apparatus 100 includes a communication section 110, a controller 120, an input/output section 130, a paper feed section 140, an image forming section 150, and storage 160. The paper feed section 140 includes at least one paper feed cassette.

The controller 120 controls operation of each section included in the image forming apparatus 100 by executing a control program stored in the storage 160. The image forming apparatus 100 is a multifunction peripheral (MFP), a copier, or a printer, for example.

The communication section 110 transmits and receives various information to and from the terminal device 200 according to an instruction of the controller 120. For example, the communication section 110 receives print data transmitted from the terminal device 200 and transmits the print data to the controller 120 through the network 50. The communication section 110 also transmits the predetermined message to at least one of the terminal devices 200 according to an instruction of the controller 120.

The controller 120 receives a print job from each terminal device 200 through the communication section 110. Specifically, the controller 120 receives print data included in the print job received from a terminal device 200 through the communication section 110. The controller 120 transmits the print data to the image forming section 150 upon receiving the print data.

The controller 120 updates a cumulative value of used sheets for a user corresponding to the terminal device 200 from which a print job is requested. Furthermore, the controller 120 specifies a user to which the predetermined message is transmitted based on the cumulative value of used sheets of the recording medium for each user. The controller 120 resets the cumulative value of used sheets for each user upon receiving a notification from the paper feed section 140 that the paper feed cassette has been replenished with paper.

The controller 120 receives a notification of a remaining amount of the recording medium from the paper feed section 140 periodically or when paper is fed for a print job. Additionally, the controller 120 notifies the terminal device 200 from which the print job is requested of the predetermined message when the number of print sheets for the print job is at least the remaining amount of the recording medium.

The input/output section 130 presents various information to each user and receives an instruction related to control from the user. The input/output section 130 also receives input of a threshold related to the remaining amount of the recording medium or a threshold related to a remaining amount of a consumable. The input/output section 130 is for example a liquid-crystal display including a touch panel. The input/output section 130 is an example of a "receiving section".

The paper feed section 140 receives replenishment of paper which is the recording medium by a user. When receiving the replenishment of paper to the paper feed cassette, the paper feed section 140 notifies the controller 120 as such. The paper feed section 140 further notifies the controller 120 of the remaining amount of the recording medium periodically or each time feeding is performed for a print job.

The paper feed section 140 can detect a paper outage. The paper feed section 140 can also detect whether or not the remaining amount of the recording medium is less than a predefined threshold. When a paper outage has been detected or the remaining amount of the recording medium is less than the threshold, the paper feed section 140 notifies the controller 120 as such.

The image forming section 150 forms an image on the recording medium according to an instruction received from the user through the input/output section 130 or print data received from the terminal device 200 through the communication section 110. The image forming section 150 can detect a paper jam and a toner outage or an ink outage. The image forming section 150 can also detect whether or not a remaining amount of toner or a remaining amount of ink is less than a predefined threshold. When a toner outage, an ink outage, or a paper jam have been detected, the remaining amount of toner is less than the threshold, or the remaining amount of ink is less than the threshold, the image forming section 150 notifies the controller 120 as such.

The storage 160 stores therein various data related to operation, various data related to control, and the control program of the image forming apparatus 100. The storage 160 also stores therein print data received through the communication section 110. The storage 160 further stores various thresholds set by the user. The storage 160 may include read-only memory (ROM), random-access memory (RAM), and either or both a hard disk drive (HDD) and a solid-state drive (SSD).

The storage 160 stores a user management table therein. Identification information for identifying the terminal device 200 associated with each user and the cumulative value of used sheets of the recording medium for each user are registered in the user management table. The cumulative value of used sheets of the recording medium is updated by the controller 120 each time a print job from the terminal device 200 is completed.

Notification data indicating notification history may also be registered in the user management table in association with each user. The notification data indicating the notification history indicates history related to notification of a message prompting resolution work to resolve an event. In a case where the notification data indicating the notification history is registered, the resolution work and the time at which each message was notified of may be registered in association with the notification data. Furthermore, weight may be given to the resolution work. For example, a weight of "3" may be given to resolution work of a paper jam, a weight of "2" may be given to replenishment work of toner or ink, and a weight of "1" may be given to replenishment work of the recording medium.

Figure 3:
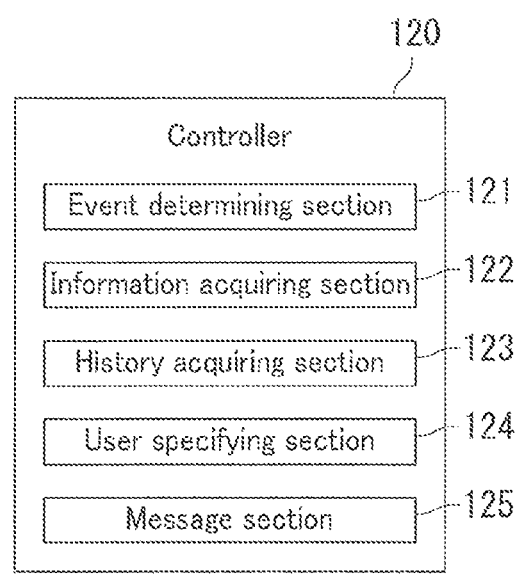
FIG. 3 is a block diagram illustrating a controller of the image forming apparatus.

The following describes a message control process though which the controller 120 controls transmission of the predetermined message with reference to FIGS. 1 to 3. FIG. 3 is a block diagram illustrating the controller 120.

As illustrated in FIG. 3, the controller 120 includes an event determining section 121, an information acquiring section 122, a history acquiring section 123, a user specifying section 124, and a message section 125.

The event determining section 121 determines whether or not an event has occurred based on notification from the paper feed section 140 or the image forming section 150. When determining that an event has occurred, the event determining section 121 notifies the information acquiring section 122, the history acquiring section 123, the user specifying section 124, and the message section 125 as such. The event determining section 121 is an example of a "determining section".

The information acquiring section 122 acquires the identification information for identifying the terminal devices 200 respectively associated with a plurality of users. For example, email addresses or IP addresses are used as the identification information for identifying the terminal devices 200. The identification information for identifying the terminal devices 200 may be reregistered in the user management table stored in the storage 160 or may be acquired by the information acquiring section 122 from each terminal device 200 when necessary. The information acquiring section 122 is an example of a "first acquiring section".

The history acquiring section 123 acquires history data indicating use history of the recording medium for each user. The history acquiring section 123 acquires at least the cumulative value of used sheets of the recording medium for each user. The history acquiring section 123 may also acquire notification data indicating the notification history from the storage 160. The history acquiring section 123 is an example of a "second acquiring section".

The user specifying section 124 specifies at least one user based on the history data when occurrence of an event has been determined. The user specifying section 124 also specifies the cumulative value of used sheets of the recording medium for all users when the occurrence of the event has been determined. The user specifying section 124 also specifies at least one user for whom the cumulative value of used sheets of the recording medium has exceeded a predetermined threshold. In particular, a single user having the greatest cumulative value of used sheets of the recording medium when occurrence of an event has been determined is specified.

The user specifying section 124 specifies one user in a situation in which there is a plurality of users for whom the cumulative value of used sheets of the recording medium has exceeded the predetermined threshold when occurrence of an event has been determined. The "one user" differs from a user most recently notified of the predetermined message. When weight is given to the resolution work, the "one user" may be specified based on the weight. The user specifying section 124 is an example of a "specifying section".

The message section 125 notifies a terminal device 200 corresponding to the user specified by the user specifying section 124 of the message prompting the resolution work. The message section 125 is an example of a "notification section".

Figure 4:
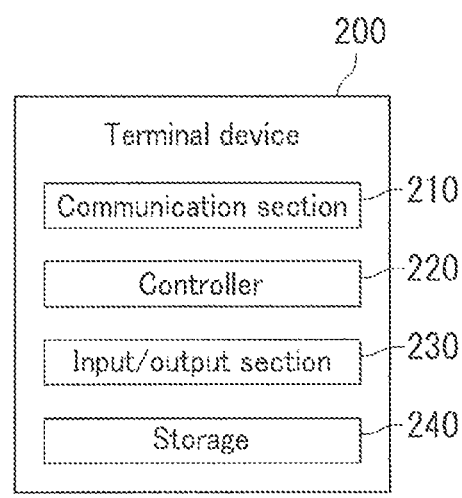
FIG. 4 is a block diagram illustrating a terminal device.

The following describes terminal devices 200 with reference to FIG. 4. FIG. 4 is a block diagram illustrating a configuration of each terminal device 200. The terminal devices 200 are each associated with a corresponding one of the users. The terminal devices 200 each are a personal computer, for example. Each terminal device 200 includes a communication section 210, a controller 220, an input/output section 230, and storage 240.

The communication section 210 transmits and receives various information to and from the image forming apparatus 100. The communication section 210 transmits print data to the image forming apparatus 100 according to an instruction of the controller 220. The communication section 210 also receives a message transmitted from the image forming apparatus 100.

The controller 220 controls overall operation of the terminal device 200. The controller 220 is for example a microcomputer, and performs control of each section of the terminal device 200 by executing a control program stored in the storage 240.

The controller 220 generates print data according to user instruction received through the input/output section 230. The controller 220 also transmits the generated print data to the image forming apparatus 100 according to user instruction received through the input/output section 230.

The input/output section 230 receives various instructions from the user. The input/output section 230 also displays a message received from the image forming apparatus 100. The input/output section 230 is for example a liquid-crystal display including a touch panel.

The storage 240 stores therein various data related to operation, various data related to control, and the control program of the terminal device 200. The storage 240 also stores therein print data generated by the controller 220. The storage 240 may include ROM, RAM, and either or both an HDD and an SSD.

Figure 5:
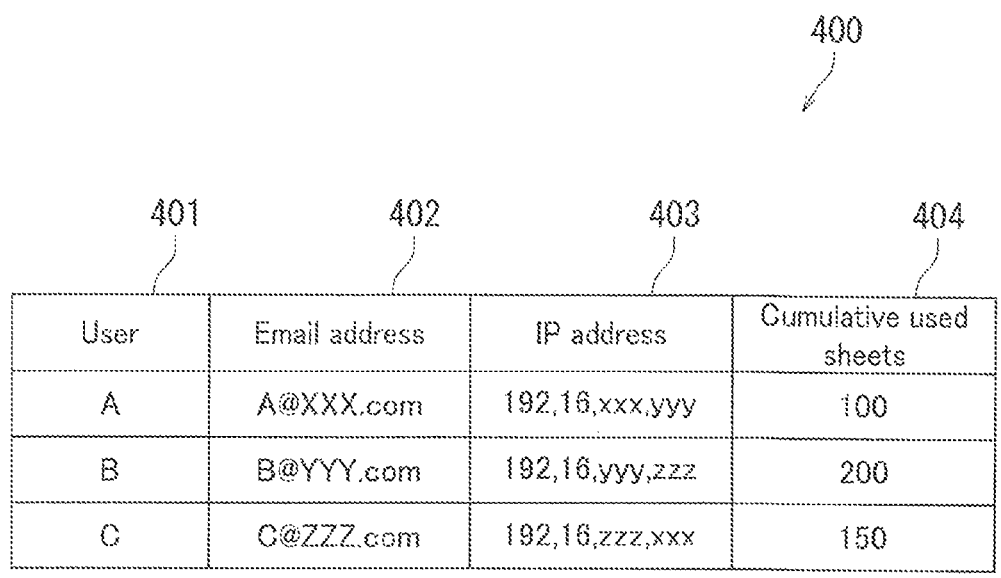
FIG. 5 is a diagram illustrating an example of a user management table stored in storage of the image forming apparatus.

The following describes the user management table stored in the storage 160 of the image forming apparatus 100. FIG. 5 is a diagram illustrating an example of the user management table stored in the storage 160 of the image forming apparatus 100. As illustrated in FIG. 5, a user management table 400 includes a user column 401, an email address column 402, an IP address column 403, and a cumulative used sheets column 404. The user column 401, the email address column 402, and the IP address column 403 indicate user information. The user column 401 and the cumulative used sheets column 404 indicate history data.

The user column 401 exhibits user names. The email address column 402 exhibits email addresses of the terminal devices 200 respectively associated with the users. The IP address column 403 exhibits IP addresses of the respective terminal devices 200. The cumulative used sheets column 404 exhibits a cumulative value of used sheets of the recording medium for each user since paper has been replenished in the paper feed cassette. In the example of the user management table 400, the user B has used the greatest amount of the recording medium.

The following describes a message control process according to the present embodiment with reference to FIGS. 1 to 6. Herein, the "message control process" is a control process performed when the controller 120 of the image forming apparatus 100 transmits the predetermined message to a terminal device 200. Specifically, the controller 120 directs transmission of the predetermined message to a specific user when an event has occurred.

Figure 6:
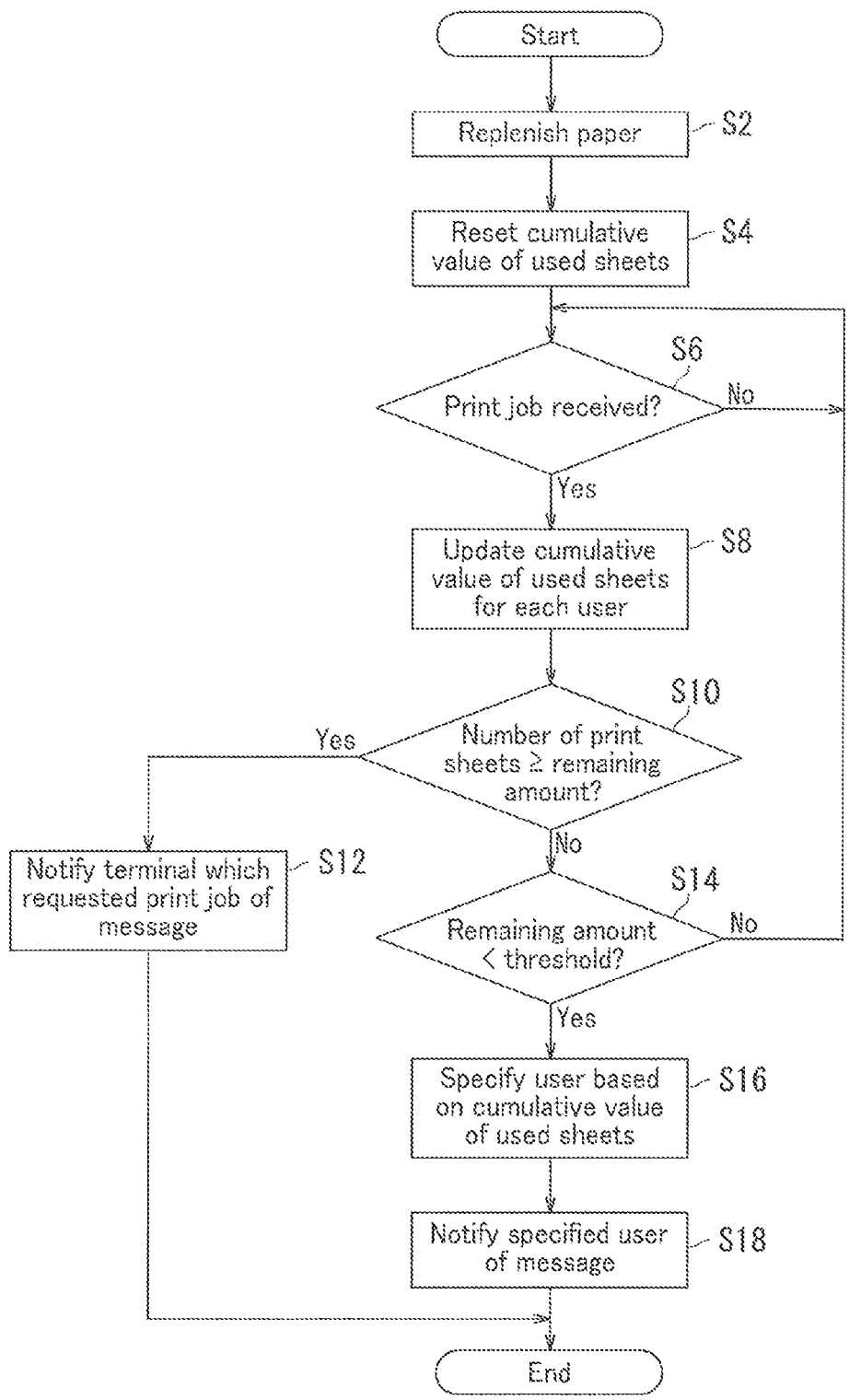
FIG. 6 is a flowchart depicting a message control process performed by the controller of the image forming apparatus.

FIG. 6 is a flowchart depicting the message control process performed by the controller 120. The message control process is performed through Steps S2 to S18.

Step S2: The paper feed section 140 receives replenishment of paper from a user. The paper feed section 140 notifies the controller 120 that the replenishment of paper has been received. The process advances to Step S4.

Step S4: The controller 120 resets the cumulative value of used sheets for each user. The process advances to Step S6.

Step S6: The controller 120 determines whether or not a print job has been received from a terminal device 200. When the controller 120 determines that a print job has not been received from a terminal device 200 (No in Step S6), the controller 120 enters standby until a print job is received. When the controller 120 determines that a print job has been received from a terminal device 200 (Yes in Step S6), the process advances to Step S8.

Step S8: The controller 120 updates the cumulative value of used sheets for a user corresponding to the terminal device 200 from which the print job has been requested. The process advances to Step S10.

Step S10: The controller 120 determines whether or not the number of print sheets of the print job is at least the remaining amount of the recording medium. When the controller 120 determines that the number of print sheets is at least the remaining amount of the recording medium (Yes in Step S10), the process advances to Step S12. When the controller 120 determines that the number of print sheets is less than the remaining amount of the recording medium (No in Step S10), the process advances to Step S14.

Step S12: The controller 120 notifies the terminal device 200 which has requested the print job of the predetermined message, and the message control process ends.

Step S14: The controller 120 determines whether or not the remaining amount of the recording medium is less than the predetermined threshold. When the controller 120 determines that the remaining amount of the recording medium is at least the predetermined threshold (No in Step S14), the process returns to Step S6. When the controller 120 determines that the remaining amount of the recording medium is less than the predetermined threshold (Yes in Step S14), the process advances to Step S16.

Step S16: The controller 120 specifies a user to which the predetermined message is to be transmitted based on the cumulative value of used sheets of the recording medium. The process advances to Step S18.

Step S18: The controller 120 transmits the predetermined message to the specified user, and the message control process ends.

As described above with reference to FIGS. 1 to 6, rationality of maintenance work for the image forming apparatus 100 can be improved by performing the message control process in the image forming system 10.

The embodiment of the present disclosure is described so far with reference to the accompanying drawings (FIGS. 1 to 6). However, the present disclosure is not limited to the above embodiment and may be implemented in various manners within a scope not departing from the gist thereof. The drawings illustrate main elements of configuration schematically to facilitate understanding thereof. Aspects of the elements of configuration in the drawings, such as thickness, length, and number thereof, may differ in practice for the sake of convenience for drawing preparation. Furthermore, aspects of the elements of configuration described in the above embodiment such as shape and dimension thereof are merely examples and not particular limitations. The elements of configuration may be variously altered within a scope not substantially departing from the configuration of the present disclosure.

In addition, the present disclosure may be implemented as a control method of an image forming apparatus including, as steps, the characteristic means of configuration of the image forming apparatus according to the present disclosure, or may be implemented as a control program including those steps. The program may be distributed through a storage medium such as a CD-ROM or a communication medium such as a communication network.

What is claimed is:

1. An image forming apparatus which forms an image on a recording medium, the image forming apparatus comprising:
    a controller;
    a determining section in the controller configured to determine whether or not an event has occurred involving interruption to an operation through which the image is formed, the event including a paper outage, a toner outage, an ink outage, or a paper jam;
    a first acquiring section in the controller configured to acquire identification information for identifying terminal devices respectively associated with a plurality of users;
    a second acquiring section in the controller configured to acquire history data indicating use history of the recording medium for each of the users;
    a specifying section in the controller configured to specify at least one user of the users based on the history data when occurrence of the event has been determined; and
    a notifying section in the controller configured to notify a terminal device corresponding to the specified user of a message prompting work to resolve the event.

2. The image forming apparatus according to claim 1, wherein
    the second acquiring section acquires a cumulative value of used sheets of the recording medium for each of the users, and
    the specifying section specifies at least one of the users for whom the cumulative value has exceeded a predetermined threshold when the occurrence of the event has been determined.

3. The image forming apparatus according to claim 2, wherein
    the cumulative value of used sheets of the recording medium is reset upon recording medium replenishment.

4. The image forming apparatus according to claim 2, wherein
    the specifying section specifies a user for whom the cumulative value is greatest when the occurrence of the event has been determined.

5. The image forming apparatus according to claim 2, wherein
    the second acquiring section acquires notification data indicating notification history related to notification of the message, and
    in a situation in which there is a plurality of users of the users for each of whom the cumulative value has exceeded the predetermined threshold when the occurrence of the event has been determined, the specifying section specifies one user of the users differing from a user corresponding to a terminal most recently notified of the message.

6. The image forming apparatus according to claim 5, wherein
    predefined weight is given to the work to resolve the event, and
    in a situation in which there is a plurality of user of the users for each of whom the cumulative value has exceeded the predetermined threshold when the occurrence of the event has been determined, the specifying section specifies the one user differing from the user corresponding to the terminal most recently notified of the message based on the weight.

7. The image forming apparatus according to claim 1, wherein
    when a jam of the recording medium has occurred, the determining section determines that the event has occurred.

8. The image forming apparatus according to claim 1, wherein
    when a remaining amount of a consumable provided for forming the image has become less than a predetermined threshold the determining section determines that the event has occurred.

9. The image forming apparatus according to claim 8, further comprising
    a receiving section configured to receive a threshold of the remaining amount of the consumable, wherein
    the determining section determines whether or not the event has occurred based on the threshold.

10. The image forming apparatus according to claim 1, wherein
the notifying section notifies the terminal device of the message when a remaining amount of the recording medium is less than a predetermined threshold.

11. The image forming apparatus according to claim 1, wherein
the notifying section notifies of the message a terminal device that has output a print job when the number of sheets to be printed based on the print job is a remaining amount or more of the recording medium.

12. A control method to be implemented by a controller in an image forming apparatus which forms an image on a recording medium, the control method comprising:
determining whether or not an event has occurred involving interruption to an operation through which the image is formed, the event including a paper outage, a toner outage, an ink outage, or a paper jam;
acquiring identification information for identifying terminal devices respectively associated with a plurality of users;
acquiring history data indicating use history of the recording medium for each of the users;
specifying at least one user of the users based on the history data when occurrence of the event has been determined; and
notifying a terminal device corresponding to the specified user of a message prompting work to resolve the event.

13. The control method according to claim 12, wherein
in the acquiring history data, a cumulative value of used sheets of the recording medium for each of the users is acquired, and
in the specifying at least one user of the users, at least one of the users for whom the cumulative value has exceeded a predetermined threshold is specified when the occurrence of the event has been determined.

14. The control method according to claim 13, further comprising
resetting the cumulative value of used sheets of the recording medium upon recording medium replenishment.

15. The control method according to claim 13, wherein
in the acquiring history data, notification data indicating notification history related to notification of the message is acquired, and
in the specifying at least one user of the users, one user of the users differing from a user corresponding to a terminal most recently notified of the message is specified in a situation in which there is a plurality of users of the users for each of whom the cumulative value has exceeded the predetermined threshold when the occurrence of the event has been determined.

16. The control method according to claim 15, further comprising
giving predefined weight to the work to resolve the event, wherein
in the specifying at least one user of the users, the one user is a user of the users differing from the user corresponding to the terminal most recently notified of the message based on the weight in a situation in which there is a plurality of users of the users for whom the cumulative value has exceeded the predetermined threshold when the occurrence of the event has been determined.

17. The control method according to claim 12, wherein
in the notifying, the terminal device of the message is notified when a remaining amount of the recording medium is less than a predetermined threshold.

18. The control method according to claim 12, wherein
in the notifying, a terminal device that has output a print jobs is notified of the message when the number of sheets to be printed based on the print job is a remaining amount or more of the recording medium.

* * * * *